(12) United States Patent
Puzio

(10) Patent No.: US 7,503,734 B2
(45) Date of Patent: Mar. 17, 2009

(54) DRILL CHUCK ACTUATOR

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 392 days.

(21) Appl. No.: 11/354,643

(22) Filed: Feb. 15, 2006

(65) Prior Publication Data

US 2006/0186610 A1 Aug. 24, 2006

Related U.S. Application Data

(60) Provisional application No. 60/654,849, filed on Feb. 18, 2005.

(51) Int. Cl.
*B23B 33/00* (2006.01)
*B23B 31/26* (2006.01)

(52) U.S. Cl. .......... 408/240; 279/62; 279/134; 279/140; 279/902

(58) Field of Classification Search ........ 279/60, 279/61, 62, 63, 150, 902, 134, 124, 140, 279/144; 408/240, 239 R
See application file for complete search history.

(56) References Cited

U.S. PATENT DOCUMENTS

| | | | | |
|---|---|---|---|---|
| 4,317,578 A | * | 3/1982 | Welch | 279/60 |
| 4,358,230 A | * | 11/1982 | Rohlin | 408/124 |
| 4,460,296 A | * | 7/1984 | Sivertson, Jr. | 408/124 |
| 4,669,932 A | | 6/1987 | Hartley | |
| 4,848,779 A | * | 7/1989 | Wheeler et al. | 279/60 |
| 5,011,341 A | * | 4/1991 | DeGroff | 408/124 |
| 5,011,343 A | * | 4/1991 | Saban et al. | 408/240 |
| 5,531,549 A | * | 7/1996 | Fossella | 408/240 |
| 5,927,914 A | * | 7/1999 | Mack et al. | 408/240 |
| 5,988,653 A | | 11/1999 | Kuo | |
| 5,992,859 A | | 11/1999 | Lin | |
| 6,007,071 A | * | 12/1999 | Middleton | 279/62 |
| 6,056,298 A | * | 5/2000 | Williams | 279/150 |
| 6,257,596 B1 | | 7/2001 | Yang | |
| 6,488,286 B2 | | 12/2002 | Yaksich | |
| 6,517,295 B2 | | 2/2003 | Lin | |
| 6,729,812 B2 | | 5/2004 | Yaksich et al. | |
| 7,008,151 B2 | * | 3/2006 | Yaksich et al. | 408/240 |
| 2006/0185870 A1 | * | 8/2006 | Gehret et al. | 173/217 |

* cited by examiner

*Primary Examiner*—David P Bryant
*Assistant Examiner*—Eric A Gates
(74) *Attorney, Agent, or Firm*—Harness, Dickey & Pierce, P.L.C.

(57) ABSTRACT

A drill is provided with a chuck that has an actuator device that is mounted to the housing of the drill and is spaced from the chuck so that a user can activate the chuck between a "chuck mode" and a "drill mode" from a switch mechanism that is mounted remotely from the chuck.

13 Claims, 7 Drawing Sheets

DRILL CHUCK ACTUATOR

CROSS-REFERENCE TO RELATED APPLICATIONS

This application claims the benefit of U.S. Provisional Application No. 60/654,849, filed on Feb. 18, 2005, the disclosure of which is incorporated herein by reference.

FIELD OF THE INVENTION

The present invention relates to a drill chuck for use with a power drill device, and more particularly, to a drill chuck capable of being tightened or loosened by operation of the drill.

BACKGROUND OF THE INVENTION

Drill chucks are used in conjunction with power drills for releasably engaging a drill bit. Conventional drill chucks also require a special tool for tightening and loosening the drill chuck onto the drill bit. Recently, drill chucks have been designed to be tightened by hand wherein a user can rotate a chuck sleeve of the drill chuck to cause the jaws of the drill chuck to engage and disengage a drill bit. The user of the drill must rotate the adjustable chuck sleeve with one hand while holding a drill bit inside the jaw members until the drill bit is locked in place. More recently, so-called self-locking drill chucks have been developed in which a drill bit can be inserted and with the chuck being disposed in a "chuck" mode, the operation of the drill will cause the chuck to be tightened or loosened, depending on the rotational direction of the drill. Currently, chuck devices that are capable of being tightened or loosened by operation of the drill are activated by adjusting the sleeve on the chuck between a drill mode position and chuck mode position.

SUMMARY OF THE INVENTION

The present invention provides a chuck that is capable of being tightened or loosened by operation of the drill and includes an actuator that has a switch mechanism that is either mounted on the drill housing and/or is spaced from the chuck.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
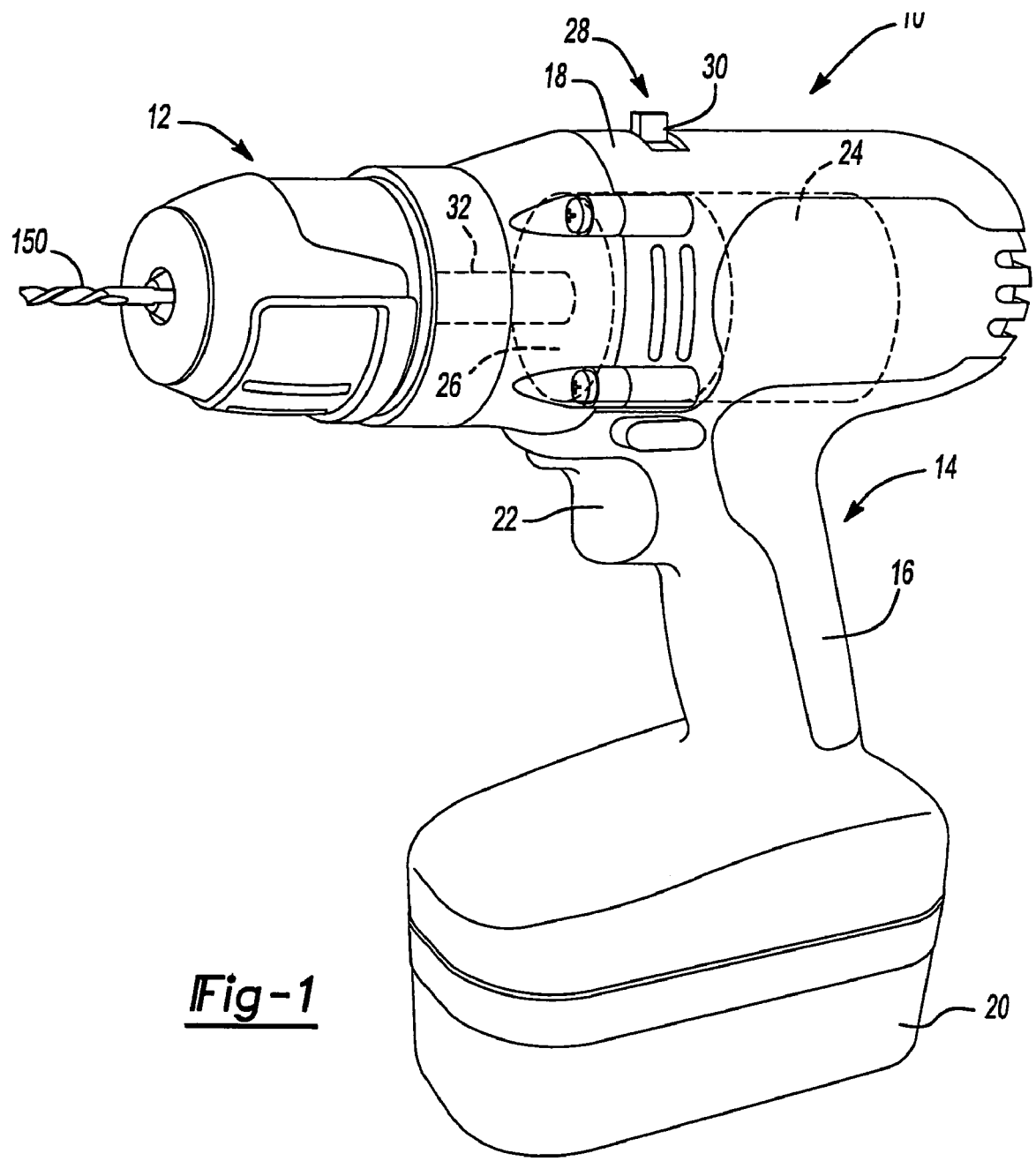
FIG. 1 is a perspective view of a drill incorporated with a drill chuck according to the principles of the present invention.

With reference to FIG. 1, a drill 10 is shown incorporating a drill chuck 12 according to the principles of the present invention. The drill 10 includes a housing 14 including a handle portion 16 and body portion 18. A battery pack 20 is releasably attached to the handle portion 16. A trigger 22 is provided on the handle 16 for selectively providing electric current from the battery pack 20 to a motor 24 provided within the body portion 18 of the housing 14. A multi-speed transmission device 26 is drivingly connected to the motor 24. The multi-speed transmission device is provided with a shift mechanism 28 including a shift lever 30 that is movable by an operator to change the gear ratio of the multi-speed transmission device. The multi-speed transmission device 26 includes a drive spindle 32 which is connected to the drill chuck 12. It should be understood that other devices, such as a torque adjustable clutch and/or hammer drill mechanism, can also be utilized in combination with the drill 10 without departing from the spirit and scope of the present invention.

With reference to FIGS. 6-9, an exemplary prior art drill chuck 12 that is capable of being tightened or loosened by operation of the drill will now be described. The drill chuck 12, as illustrated, is further disclosed in U.S. Pat. No. 6,247,706. Although the present invention will be described in combination with the exemplary drill chuck, it should be understood that the present invention is applicable to other drill chuck designs. The drill chuck 12 includes a core body 40 having a forward section 42 and rearward section 44. The forward section 42 includes a through hole 46 that receives a drill bit therein. The rearward section 44 includes threads 48 in the through hole 46 that are adapted to be threadedly engaged with the drive spindle 32 (FIG. 1). The core body 40 includes a collar 50 provided with a plurality of guide channels 52 which intersect the through hole 46 at an angle. A plurality of jaw members 54 are received in the guide channels 52 with each jaw member provided with a threaded surface 56 on the outer side and a gripping surface 58 on its forward inner surface. A threaded nut 60 surrounds the core body 40 and includes a tapered threaded surface 62 in threaded engagement with threaded surfaces 56 of jaw members 54. The threaded nut 60 includes a plurality of recesses 64 formed on its forward surface and a number of teeth 66 formed on a rearward surface.

Figure 7:
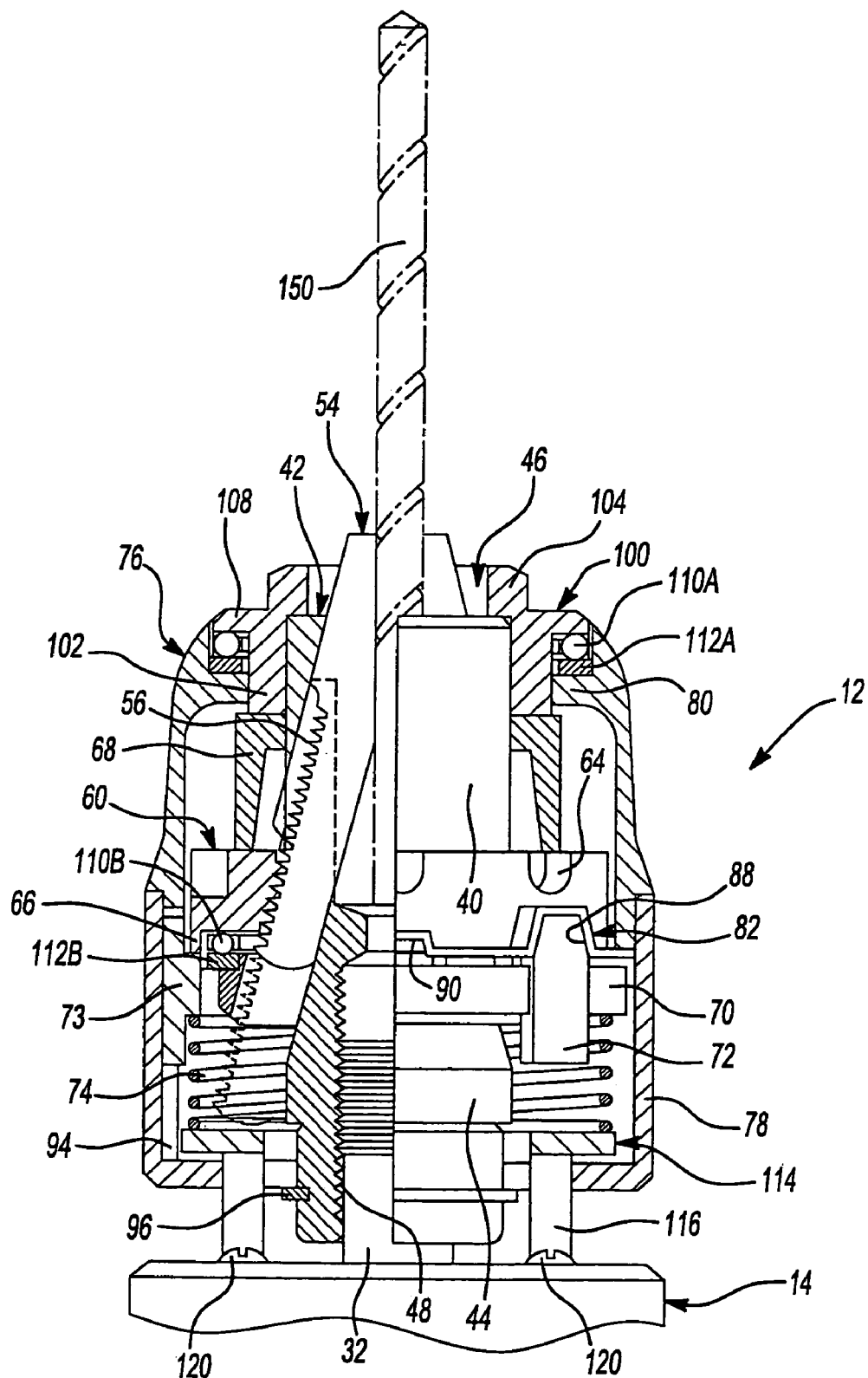
FIG. 7 is a partially sectioned view of the prior art chuck according to the principles of the present invention.

A nut cover 68 is axially mounted around the forward section 42 of core body 40 and is in contact with the threaded nut 60. An impact ring 70 is ring shaped and embossed with a plurality of tooth-like impact members 73 with sloping sides around its periphery for mating with teeth 66 on threaded nut 60. A coil spring 74 engages the impact ring 70 to flexibly support the rear of the impact ring 70. A forward housing (chuck sleeve) 76 and rearward housing 78 encase the drill chuck 12. A locking ring 80 extends radially inward from the inside wall of the forward housing 76, as best shown in FIG. 7. The forward housing 76 also includes a plurality of alternating deep and shallow locking recesses 82, 84 disposed on a rear end thereof. A wear ring 86 is provided with corresponding deep and shallow recesses 88, 90 and is disposed against the rear end of forward housing 76. The deep and shallow recesses 88, 90 of the wear ring 86 receive tooth-like members 72 on impact ring 70. The rearward housing 78 covers the rearward end of the forward housing section (chuck sleeve) 76 and engages a wedge shaped stop 92 provided on the outer surface of the forward housing 76 to maintain the axial position of the rearward housing 78 relative to the forward housing 76. The tooth-like members 72 of the impact ring 70 slidably engage axially extending recess channels 94 provided on the inner surface of the rearward housing 78.

The rearward section 44 of the core body 40 is received through the rearward opening of the rearward housing 78 with a locking ring 96 engaging a recessed groove 98 provided on the rear section 44 of the core body 40 for securing the axial position of the rearward housing 78 relative to the core body 40.

A nose sleeve 100 is provided with a rear positioning portion 102 and a forward nose portion 104, with the positioning portion 102 having a cylindrical center through hole and a plurality of positioning ridges 106 raised from the inner wall for engaging the forward section 42 of core body 40. A stop flange 108 is provided around the outer wall that forms a rest surface with the locking ring 80 on the forward housing 76 when the nose sleeve 100 is inserted onto forward section 42 of core body 40.

A pair of bearing rings 110A and washers 112A are provided to rotatably support the forward housing 76. Additional bearing ring 110B and washer 112B provide a rotational support between the nut member 60 and collar 50 of core body 40. A joint member 114, having a ring shape, is disposed between the coil spring 74 and rearward housing 78. The joint member 114 includes a plurality of joint arms 116 which can be inserted through fan shaped slots 118 and join with bolts 120, or otherwise attached to the tool housing 14 on drill housing 10, as best shown in FIG. 7. Thus, the rearward housing 78, spring 74, and impact ring 70 are joined together as one unit since joint member 114 is engaged to the bolts 120 on the housing 14 and thus, will not rotate along with spindle 32. The joint member 114 is subject to the force from spring 74.

Figure 9:
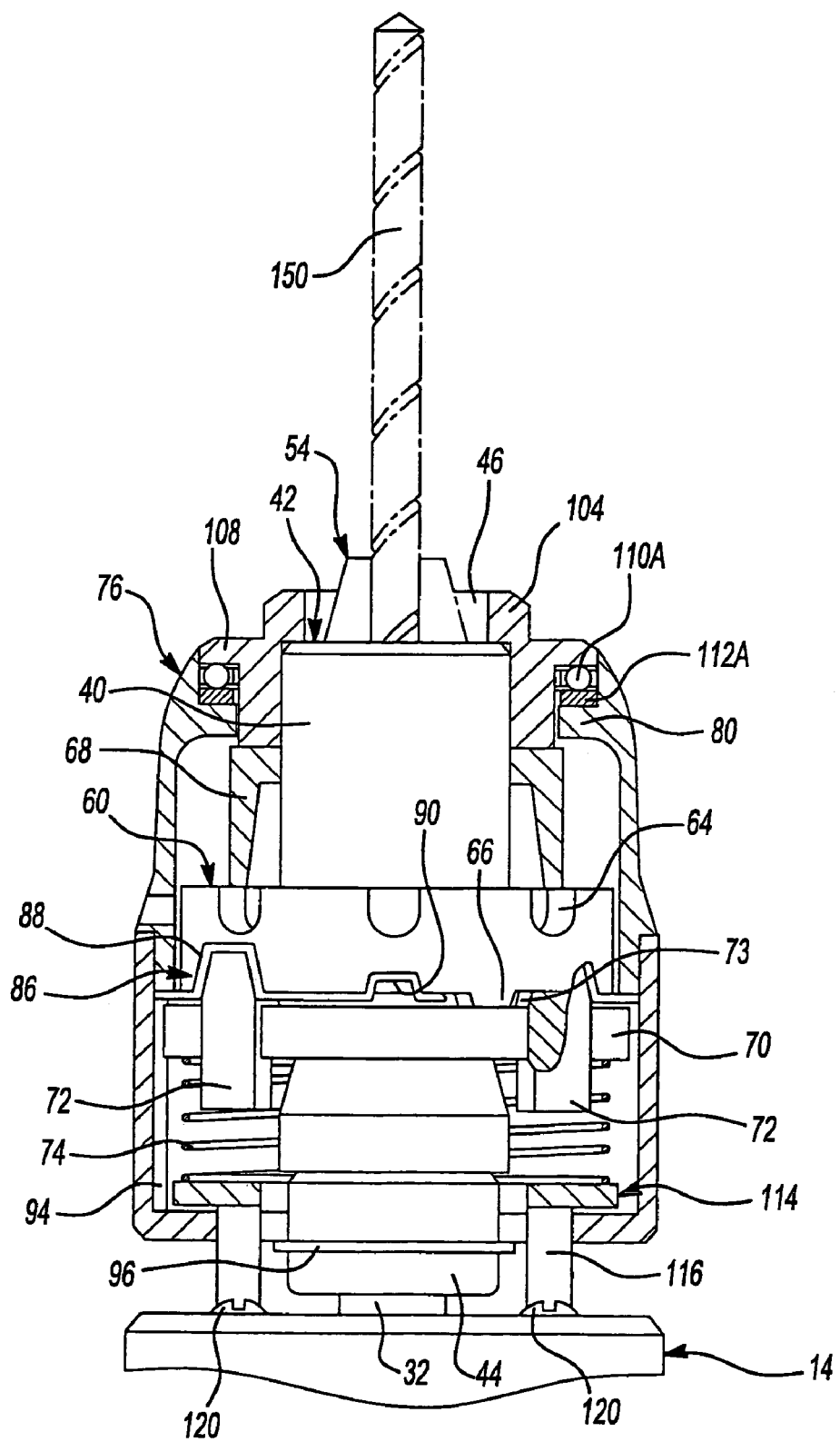
FIG. 9 is a partially sectioned view of the prior art chuck in its chuck mode according to the principles of the present invention.

FIGS. 7 and 9, illustrate the chuck in the "chuck mode". By "chuck mode," it is meant that the chuck is operable to either tighten the jaws to firmly grasp the accessory or to loosen the jaws to allow removal of the accessory by operation of the drill. In the "chuck mode", the chuck sleeve 76 and the wear-resistant ring 86 are rotated so that teeth 72 of impact ring 70 engage the deep recesses 88 in wear resistant ring. At this time, the impact ring 70 will move upwards due to the flex action of the spring 74 and while the tooth-like members 72 engage with deep recesses 88, impact teeth 73 will simultaneously align with teeth 66 on nut member 60. The rotationally positioned impact ring 70 moves forward in recessed channels 94 provided in the rearward housing 78 and is also capable of moving rearward against the biasing force of the spring 74.

As shown in FIGS. 7 and 9, a drill bit 150 is inserted in the center hole 46 provided in the forward section 42 of the core body 40, with each of the jaw members 54 being retracted sufficiently to allow clearance for the drill bit 150 to be inserted. As the drive spindle 32 rotates in its operational direction, the core body 40 and jaw members 54 rotate therewith. Initially, the nut member 60 does not rotate since it is coupled to impact ring 70 via engagement of teeth 66 with impact teeth 73. The impact ring 70 is held stationary by rear housing 78. Through the action of the tapered threaded surface 62 of the stationary nut member 60 with the threaded surface 56 of rotating jaw members 54, the jaw members 54 instantly incline forward causing the gripping surface 58 of the jaw members 54 to move toward the axis of rotation and clamp down on the drill bit 150. Jaw members 54 are prohibited from moving further forward due to the presence of the drill bit 150. When the tightening of the jaw members 54 is complete, the threaded surface 56 and the tapered threaded surface 62 of the nut member 60 join in threaded engagement causing the nut member 60 to then rotate simultaneously with the core body 40. As the nut member 60 begins to rotate, the impact ring is able to reciprocate axially against the biasing force of spring 74 so that the impact teeth 73 ride up the sloped sides of the teeth 66 as the torque increases. When the nut member 60 is fully tightened, the impact ring 70 will continue to axially reciprocate as the impact teeth 73 ride upon successive ones of the teeth 60. The sound of the parts impacting thereby is an indication that the chuck 12 is tightened. Loosening of the jaw members 54 is obtained by reversing a rotational direction of the motor, thus initially causing the nut member 60 to be driven in a reverse direction with the impact teeth 73 of the impact ring 70 providing a resistance to the rotation of the nut member 60, thus causing the jaws 54 to retract. In other words, the rotary impact of teeth 66 of nut member 60 with rotationally stationary impact teeth 73 of impact ring 70 tends to cause the nut 70 to tighten or loosen depending upon the direction of rotation of the spindle 32.

Figure 8:
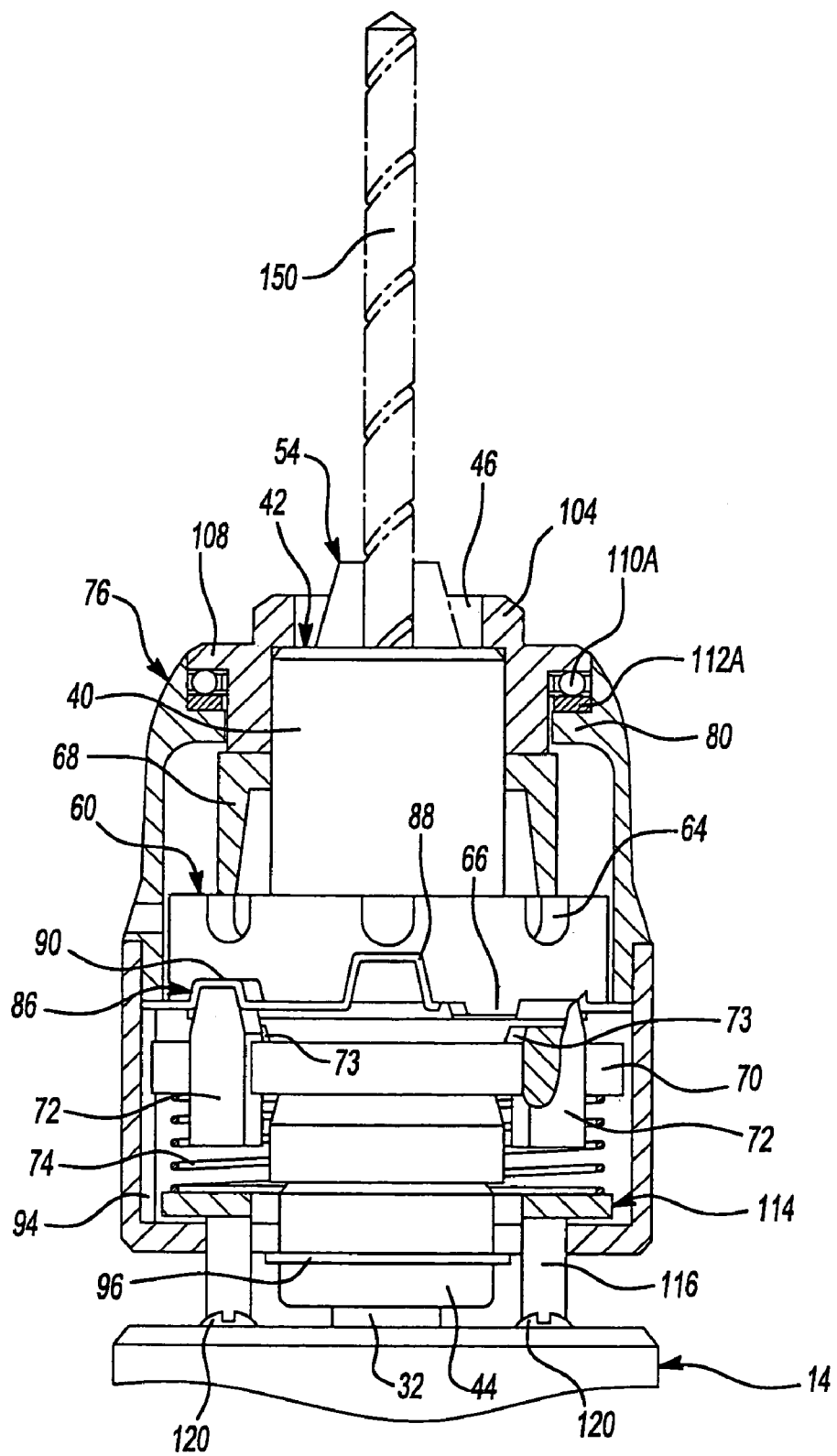
FIG. 8 is a partially sectioned view of the prior art chuck in its normal drilling mode according to the principles of the present invention.

FIG. 8 shows a partial cut-away view of the chuck 12 in a "drilling mode". In the drilling mode, the rotational position of the forward housing (chuck sleeve) 76 is selected such that the shallow recesses 90 on wear resistant ring 86 engage tooth-like members 72. At this time, the impact ring 70 will be supported by the wear resistant ring 86 and move rearward causing impact teeth 73 to disengage from teeth 66 on the nut member 60 causing the nut member 60 to be free of any contact while the nut member 60 is being rotated along with the core body 40 and jaw members 54. Thus, in the drill mode, the jaw members 54 which have been tightened onto the tool implement will tend to stay tightened since the impact ring 70 is held disengaged from the nut member 60.

Figure 2:
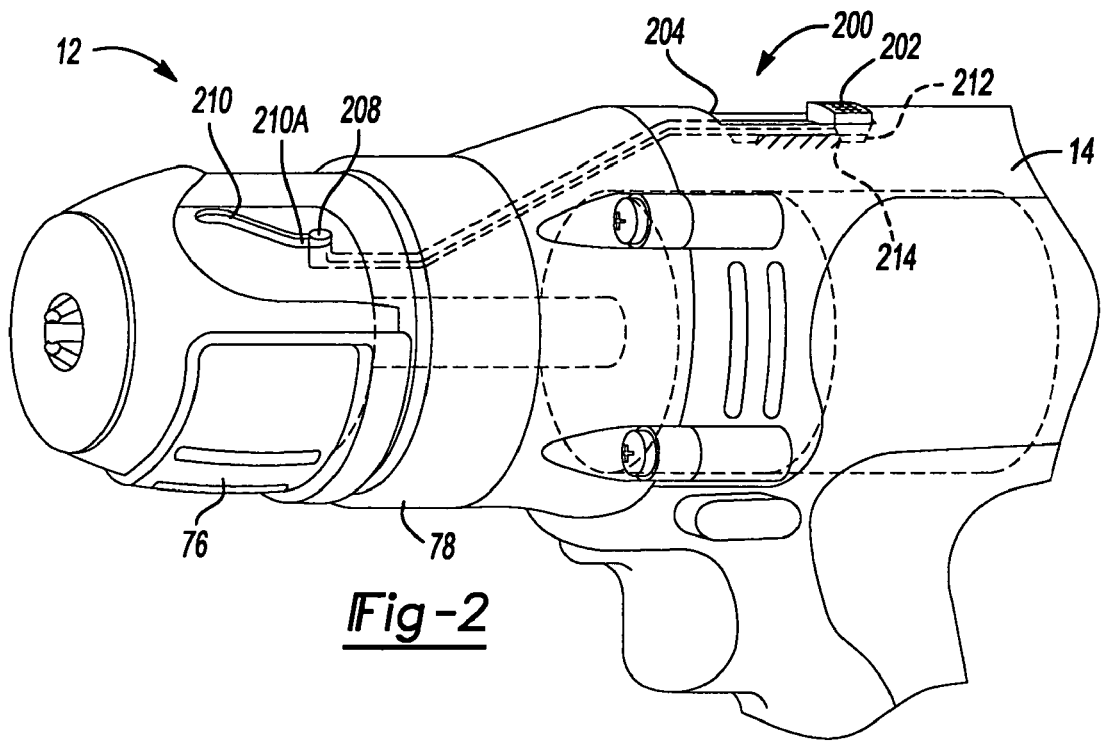
FIG. 2 is a perspective view of the drill having the drill chuck according to a first embodiment of the present invention, shown in the drill mode.
Figure 3:
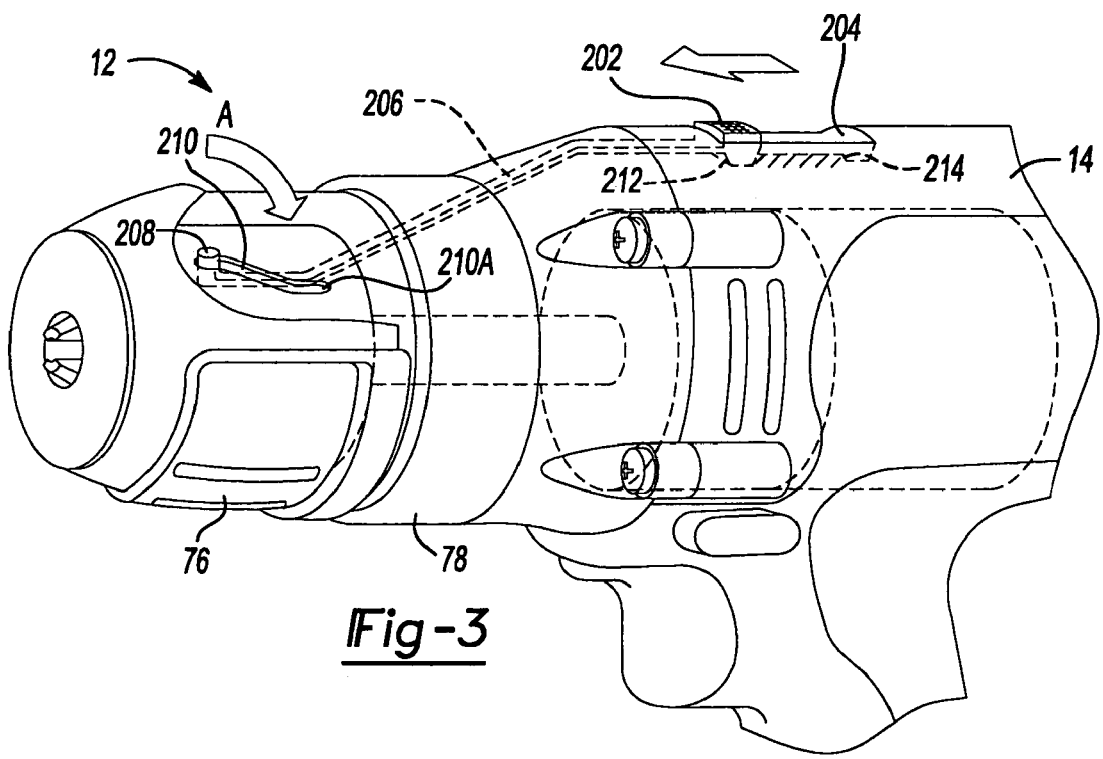
FIG. 3 is a perspective view of the drill having the drill chuck according to the principles of the present invention in the chuck mode.

With reference to FIGS. 2 and 3, an actuator for the drill chuck will now be described. The actuator device 200 includes a shift lever 202 disposed in an opening 204 provided in the drill housing 14. An arm 206 extends from the lever 202 through the housing 14 and into the rearward housing 78 and forward housing 76 of the drill chuck 12. The arm 206 includes a pin 208 provided on a distal end thereof for engagement with a cam slot 210 which is disposed on the forward housing 76. When the shift lever 202 is in the rearward "drill" position, the pin 208 is disposed in the rearward end 210A of cam slot 210. When the shift lever 202 is moved to the forward "chuck" position, as illustrated in FIG. 3, the pin 208 traverses the cam slot 210 causing rotation of the forward housing (sleeve) 76 of the chuck actuator 12 to rotate in the direction of arrow A to the chuck mode position. In order to secure the shift lever 202 in place, a detent 212 is provided on the shift arm 206 and engages a corresponding detent 214 provided within the housing 14. Thus, when the shift lever 202 is in the drill mode position, as illustrated in FIG. 2, the detent 212 is on the rearward side of the detent 214. When the shift lever 202 is moved to the forward "chuck" mode position, as illustrated in FIG. 3, the detent 212 is moved to the forward side of the detent 214 in order to prevent the shift lever 202 from inadvertently being moved from either the chuck mode or drill mode position. It is noted that the position of the pin and cam slot can be reversed so that the pin is on the sleeve 76 and the arm 206 supports the cam slot.

Figure 4:
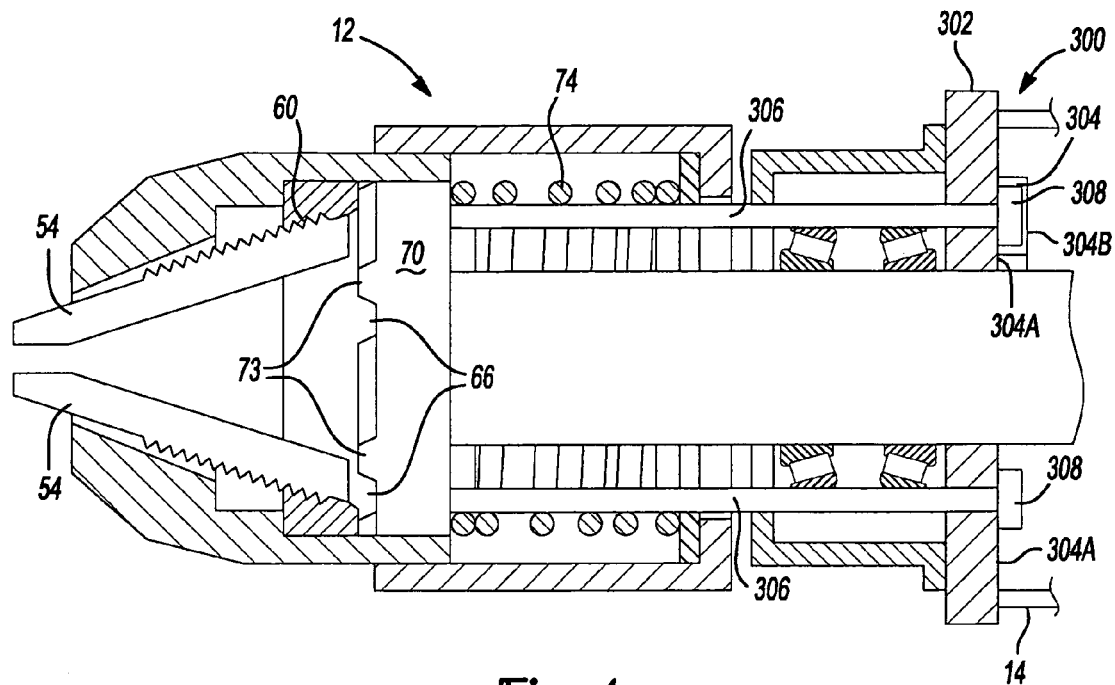
FIG. 4 is a schematic view of a drill chuck incorporating a remote actuator according to a second embodiment of the present invention shown in a chuck mode position.
Figure 5:
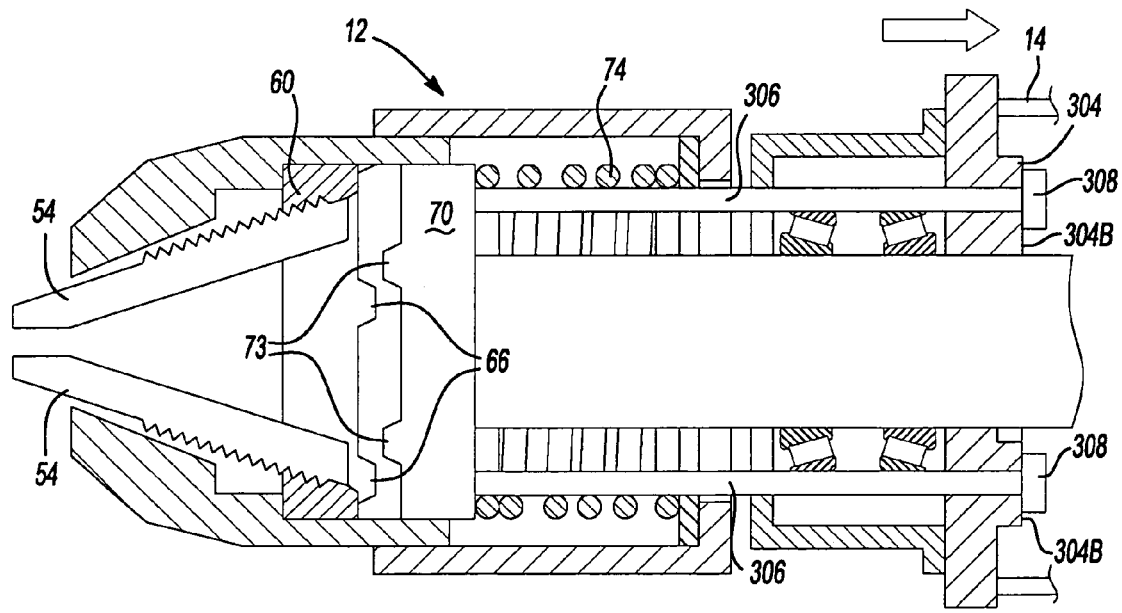
FIG. 5 is a schematic view of the drill chuck and the remote actuator illustrated in FIG. 4 shown in the drill mode position.
Figure 6:
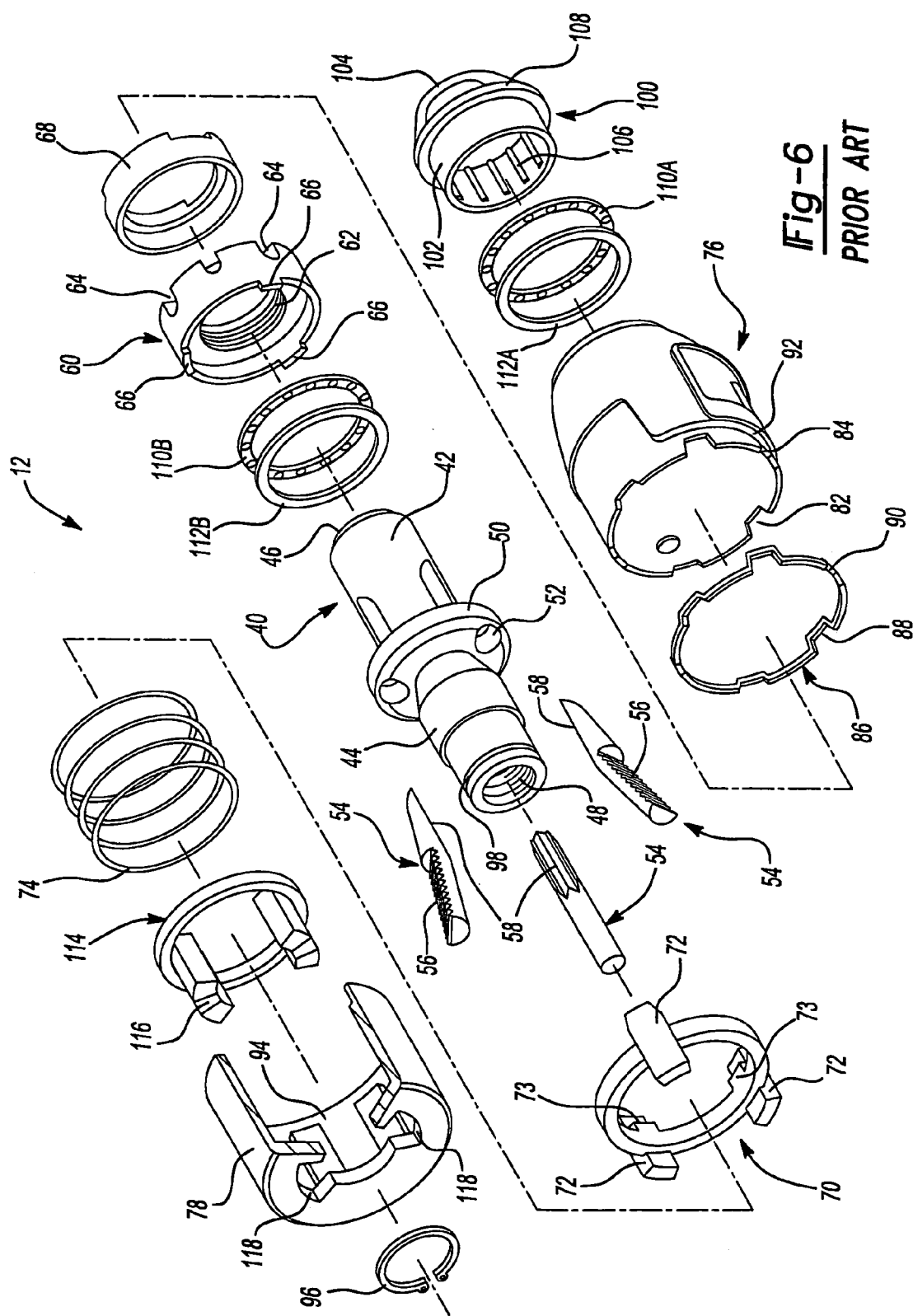
FIG. 6 is an exploded perspective view of an exemplary prior art drill chuck according to the principles of the present invention.

With reference to FIGS. 4 and 5, an alternative actuator device 300 will now be described. As illustrated in FIG. 4, a rotary switch member 302 is provided mounted to the housing 14 of the drill 10 and spaced from the drill chuck 12. The rotary switch member 302 includes a cam surface 304. The cam surface 304 includes a first base position 304A and a raised position 304B. The impact ring 70 is biased in a forward direction by spring 74 against nut member 60 such that teeth 73 engage teeth 66 of nut member 60. The actuator device 300 includes connecting arms 306 which are attached to the impact ring 70. Each arm 306 includes a follower head portion 308 which engages the cam surface 304 of rotary switch 302. The spring member 74 biases the impact ring 70 in a forward direction, such that when the follower head portions 308 of arm members 306 are disposed against the base portion 304A of cam surface 304, the impact ring 70 is movable to a forward position such that teeth 73 engage teeth 66 of nut member 60 so that the drill chuck is operable in a chuck mode as described above. In the drill mode, the rotary switch 302 is rotated so that the head portion 308 of arms 306 ride up the cam surface to the raised cam position 304B as illustrated in FIG. 5, so that the impact ring 70 is retracted rearward so that teeth 73 do not engage the teeth 66 of nut member 60 so that the drill chuck 12 is now in the drill mode. It should be noted that the rotary switch 302 can be mounted to the housing 14 of drill 10 and is preferably spaced from the drill chuck 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drill, comprising:
    a drill housing including a handle and a body portion;
    a motor disposed on said body portion;
    a drive spindle drivingly connected to said motor;
    a chuck attached to said drive spindle at a position forward of said drill housing and including a chuck housing having a cam slot extending therethrough, said cam slot having a first end longitudinally spaced from and rotationally offset from a second end thereof, said chuck being operable in a drilling mode and a chuck mode, said chuck including an actuating device mounted on said drill housing, said actuating device including at least one arm member extending from said chuck and engaging a switch member mounted to said housing, said arm member including a pin located within said cam slot and displaceable from said first end to said second end by the switch member, said chuck being operable in said drilling mode when said pin is located at said first end and being operable in said chuck mode when said pin is at said second end.

2. The drill according to claim 1, wherein said switch member is a slide switch.

3. The drill according to claim 1, further comprising a core member rotationally fixed to said drive spindle and a series of jaw members disposed within said core member, said chuck housing including a recess in an end thereof, said chuck including an impact ring having a protrusion extending within said recess in said chuck housing.

4. The drill according to claim 3, wherein said chuck includes a nut member threadingly engaged with said jaw members, said nut member being engaged with said impact ring when said pin is at said second end of said cam slot and being disengaged from said impact ring when said pin is at said first end.

5. The drill according to claim 4, wherein said impact ring is axially displaced from said nut member when said pin is at said first end of said cam slot.

6. The drill according to claim 4, wherein said impact ring axially abuts said nut member when said pin is at said second end of said cam slot.

7. The drill according to claim 4, wherein said chuck housing is rotationally displaced from a first position to a second position when said pin is displaced from said first end of said cam slot to said second end.

8. A drill, comprising: a housing including a handle and a body portion; a motor disposed on said body portion; a drive spindle drivingly connected to said motor; a chuck attached to said drive spindle at a position forward of said housing, said chuck being operable in a drilling mode and a chuck mode; and an actuating device including a switch member and at least one arm member, said switch member being spaced from said chuck and directly mounted to said housing and including a cam surface, said arm member extending from said chuck and engaging said cam surface of said switch member, said actuating device being operable for switching said chuck between said drilling mode and said chuck mode.

9. The drill according to claim 8, wherein said at least one arm member includes a pin extending therefrom.

10. The drill according to claim 9, wherein said chuck includes a cam slot having said pin disposed therein.

11. The drill according to claim 10, wherein at least a portion of said cam slot is disposed at an angle relative to a rotational axis of said drill.

12. The drill according to claim 8, wherein said switch member is a rotary switch.

13. The drill according to claim 8, wherein said switch member is a slide switch.

* * * * *